(12) United States Patent
Lange et al.

(10) Patent No.: US 6,457,091 B1
(45) Date of Patent: Sep. 24, 2002

(54) PCI BRIDGE CONFIGURATION HAVING PHYSICALLY SEPARATE PARTS

(75) Inventors: Ronald E. Lange, Glendale, AZ (US); David Ross Evoy, Tempe, AZ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/311,911

(22) Filed: May 14, 1999

(51) Int. Cl.[7] ............................................... G06F 13/36
(52) U.S. Cl. ...................................... 710/314; 710/303
(58) Field of Search ................................ 710/101, 102, 710/103, 303, 304, 314, 300, 301, 302

(56) References Cited

U.S. PATENT DOCUMENTS

| 5,751,975 A | 5/1998 | Gillespie et al. | |
|---|---|---|---|
| 5,768,612 A | 6/1998 | Nelson | |
| 5,826,043 A * | 10/1998 | Smith et al. | 710/101 |
| 5,835,739 A | 11/1998 | Bell et al. | |
| 5,838,935 A | 11/1998 | Davis et al. | |
| 6,003,105 A * | 12/1999 | Vicard et al. | 710/314 |
| 6,088,752 A * | 7/2000 | Ahern | 710/128 |

* cited by examiner

Primary Examiner—Glenn A. Auve
(74) Attorney, Agent, or Firm—Peter Zawilski

(57) ABSTRACT

A computer system includes a host processor, a first PCI bus, a second PCI bus and a PCI-to-PCI bridge. The first PCI bus is coupled with the host processor. The PCI-to-PCI bridge interconnects the first and second PCI buses. The PCI-to-PCI bridge includes a first portion and a second portion. The first portion includes a first configuration register and the second portion includes a second configuration register. A method is also taught.

13 Claims, 6 Drawing Sheets

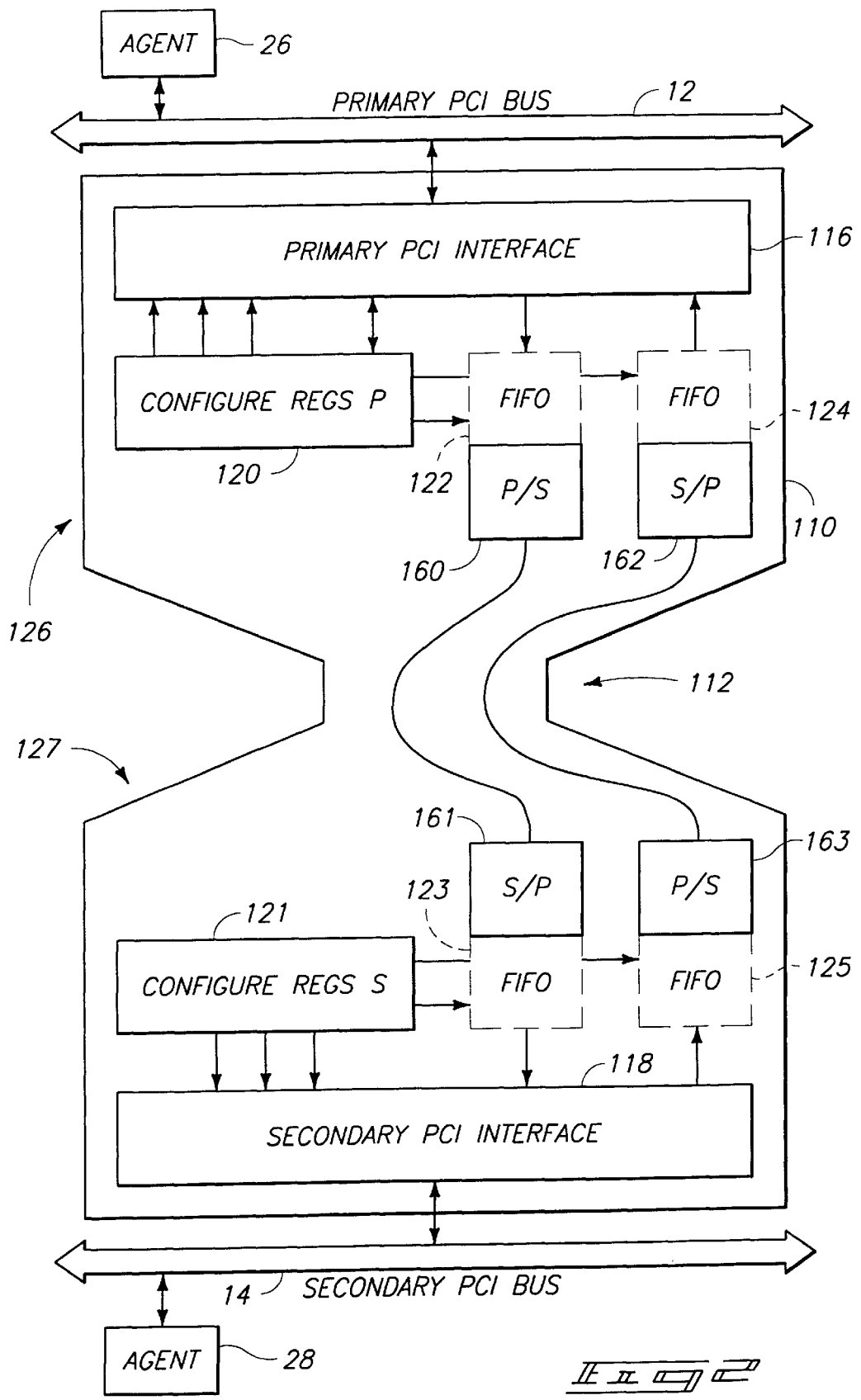

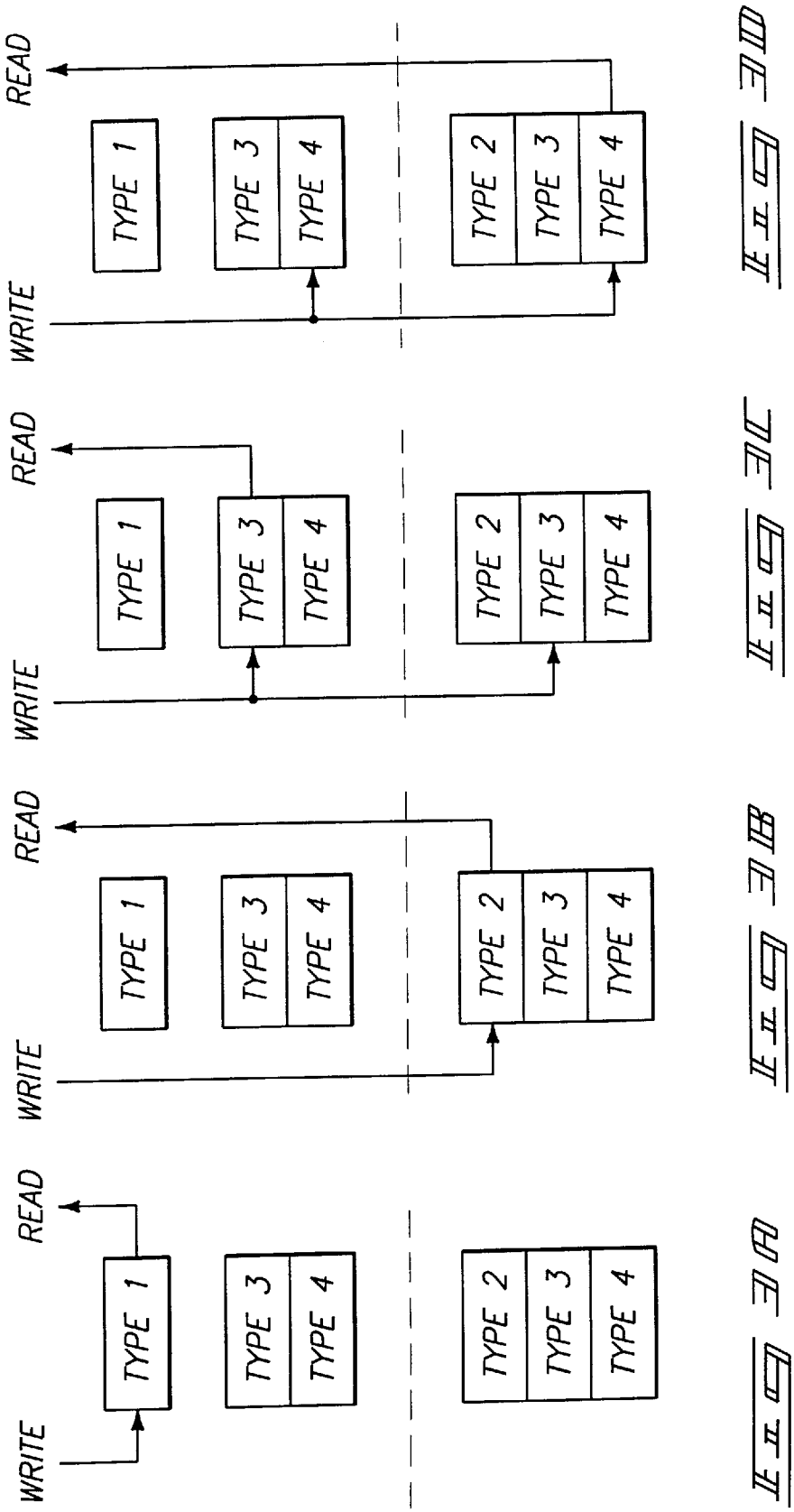

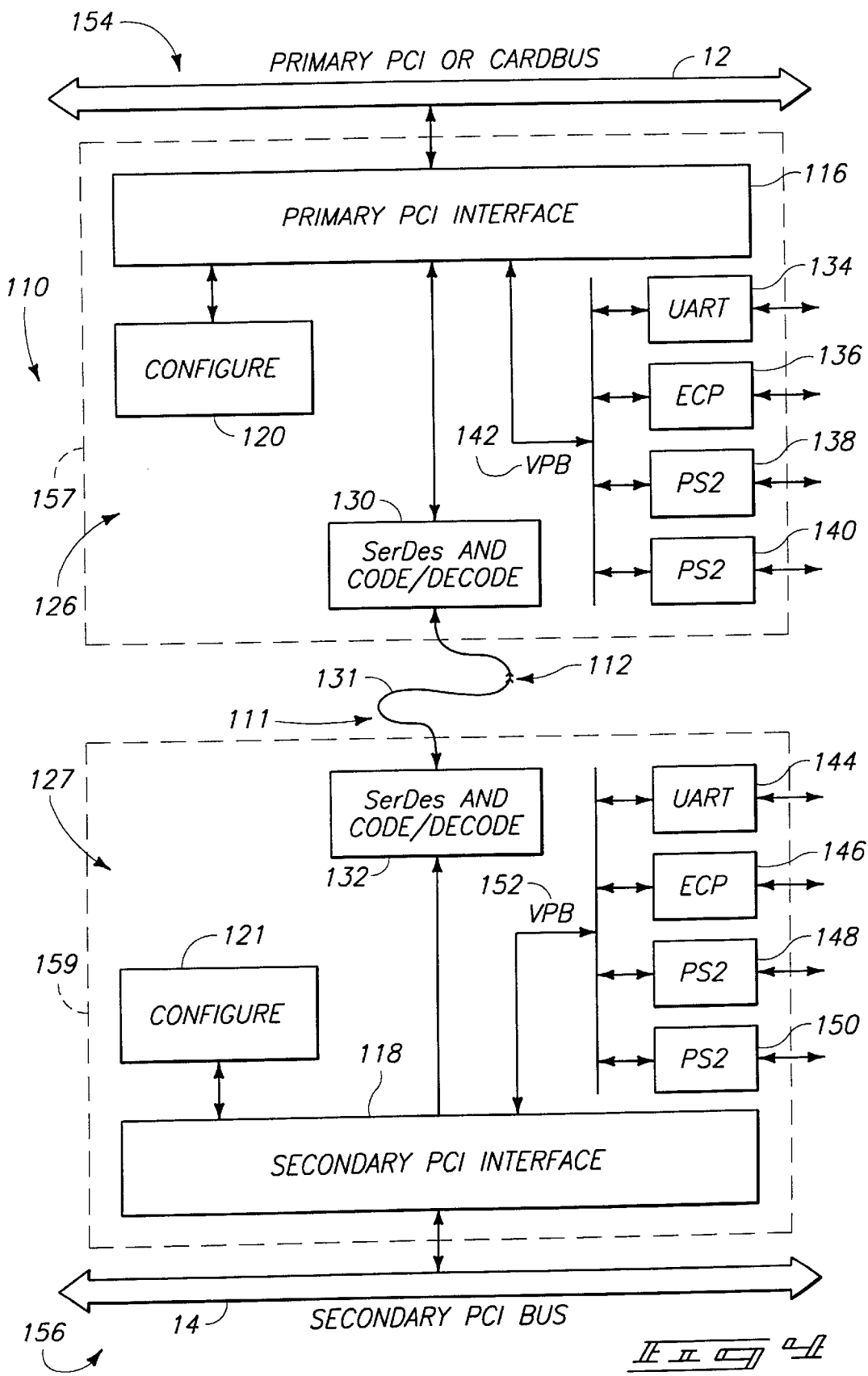

| FIG6A | FIG6B |

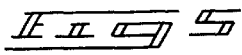

| BYTE 3 | BYTE 2 | BYTE 1 |
|---|---|---|
| DEVICE ID || |
| STATUS || |
| CLASS CODE || |
| BIST | HEADER TYPE | |
| RESERVED || |
| RESERVED || |
| SECONDARY LATENCY TIMER | SUBORDINATE BUS NUMBER | |
| SECONDARY STATUS || |
| MEMORY LIMIT || |
| PREFETCHABLE MEMORY LIMIT || |
| RESERVED || |
| RESERVED || |
| I/O LIMIT1 UPPER 16 BITS || |
| SUBSYSTEM ID || |
| RESERVED EXPANSION ROM BASE ADDRESS || |
| BRIDGE CONTROL || |
| RESERVED || |
| I/O LIMIT2 UPPER 16 BITS || |
| POWER MANAGEMENT CAPABILITIES, (PMC) || |
| DATA [NOT USED] | PMCSR_BSE BRIDGE SUPPORT EXTENSIONS | |
| RESERVED || |
| RESERVED || |
| RESERVED | | |
| RESERVED || |
| RESERVED || |
| RESERVED || |
| RESERVED || |
| RESERVED || |
| RESERVED || |
| RESERVED || |
| DOCK ID REGISTER [NOT IMPLEMENTED] || |

| | BYTE 2 | OFFSET |
|---|---|---|
| | VENDOR ID | 00h |
| | COMMAND | 04h |
| | REVISION ID | 08h |
| MASTER LATENCY TIMER | CACHE LINE SIZE | 0Ch |
| | | 10h |
| | | 14h |
| SECONDARY BUS NUMBER | PRIMARY BUS NUMBER | 18h |
| IO LIMIT1 ADDRESS | IO BASE1 ADDRESS | 1Ch |
| | MEMORY BASE | 20h |
| | PREFETCHABLE MEMORY BASE | 24h |
| | | 28h |
| | | 2Ch |
| | I/O BASE1 UPPER 16 BITS | 30h |
| | SUBSYSTEM VENDOR ID | 34h |
| | | 38h |
| INTERRUPT PIN | INTERRUPT LINE | 3Ch |
| IO LIMIT2 ADDRESS | IO BASE2 ADDRESS | 40h |
| | I/O BASE2 UPPER 16 BITS | 44h |
| NEXT ITEM PTR | CAPABILITY ID | 48h |
| POWER MANAGEMENT CONTROL/STATUS REGISTER (PMCSR) | | 4Ch |
| | CAP_PTR | 50h |
| | | 54h |
| MSCCFG3 | MSCCFG2 | 58h |
| | | 5Ch-60h |
| ERR_CNT_SEC | SECINTS | 64h |
| | | 68h-74h |
| MERLIN BRIDGE CONTROL/STATUS REGISTER (MBCSR) | | 80h |
| | NOTEBOOK GPIO REGISTER | 84h |
| | DOCK GPIO REGISTER | 88h |
| | USER SUBSYSTEM VENDOR ID | 8Ch |
| | | 90h |

FIG. 6B

PCI BRIDGE CONFIGURATION HAVING PHYSICALLY SEPARATE PARTS

TECHNICAL FIELD

This invention relates to interfaces between bus systems of computer devices, and more particularly, to PCI bridge configurations having portions provided at physically separate locations.

BACKGROUND OF THE INVENTION

The transfer of information within a computer system is handled by one or more buses. A typical computer system includes a number of devices, or agents, such as microprocessors, display devices, storage devices and input/output devices. One or more system buses are used to interconnect these agents in order to transfer control, address and data signals. More recently, computer systems have employed multiple buses, with individual agents being couple to one of the buses.

Multiple-bus computer systems utilize bus bridges in order to connect together the buses such that agents on one bus can couple to agents on another bus. Accordingly, bus bridges provide an interface between two bus systems which enable the connection between subsystems of a computer system. One example involves coupling together a processor and an expansion bus of a computer system via a bus bridge.

One type of bus that has recently become popular is the peripheral component interconnect (PCI) local bus. The PCI bus was designed to place agents, or peripheral components, in closer electrical proximity with a central processing unit so as to improve system performance for graphics, network and multimedia applications.

FIG. 1 illustrates a prior art computer system 30 having a conventional PCI bus bridge 10 coupled between a primary PCI bus 12 and a secondary PCI bus 14. According to one implementation, primary PCI bus 12 is a processor bus and secondary PCI bus is an I/O bus. However, it is understood that bridge 10 can couple together any two buses 12 and 14, not merely a processor bus and an I/O bus.

PCI bus bridge 10 includes a primary PCI interface 16, a secondary PCI interface 18, configuration registers 20 and first-in-first-out (FIFO) queues 22 and 24. An agent 26 is coupled to primary PCI bus 12 and another agent 28 is coupled to secondary PCI bus 14. In use, configuration registers 20 operate as a temporary storage buffer for storing data that is being transferred between buses 12 and 14. FIFO queue 22 is used to store requests that are issued on primary PCI bus 12 and target an agent 26 on bus 12. Similarly, FIFO queue 24 is used to store requests that are issued on secondary PCI bus 14 and target an agent 28 on bus 14. As shown in FIG. 1, the status of FIFO queues 22 and 24 are available to both primary PCI interface 16 and secondary PCI interface 18 at all times.

In operation, the configuration registers 20 are written and read by primary PCI bus 12. Registers 20 control the behavior of primary PCI interface 16, secondary PCI interface 18 and FIFO queues 22 and 24. However, the primary PCI bus 12 and secondary PCI bus 14 cannot be physically separated apart since the configuration registers 20 are loaded via primary PCI bus 12, and serve to control the action of both primary PCI bus 12 and secondary PCI bus 14. Such inability to separate PCI bus bridge 10 between two buses 12 and 14 reduces the number of available applications. For example, such PCI bus bridge 10 cannot be used to couple a notebook computer having a PCI bus with a docking station having a second PCI bus.

Therefore, there exists a need to provide for a PCI bus bridge that enables physical separation between a primary PCI bus and a secondary PCI bus.

SUMMARY OF THE INVENTION

An apparatus and a method are provided for configuring a PCI bus bridge between two physically separate locations via two portions, or halves, of a physically separable PCI bus bridge. A latency inducing bus which introduces a period of latency is used to connect the two halves of the PCI bus bridge. Two sets of redundant configuration registers are provided, one set in the primary side of the bridge and another set in the secondary side of the bridge. Furthermore, four types of configuration registers are provide in the PCI bus bridge. First, registers are provided that exist only in the primary side of the bridge. Secondly, registers are provided that exist only in the secondary side of the bridge. Thirdly, registers are provided that exist as read/write registers in the primary side of the bridge and write a shadow register in the secondary bridge. Finally, registers are provided that exist as read/write registers in the secondary side of the bridge and use a shadow register in the primary side of the bridge. According to one specific implementation, two separate locations are provided on a laptop and a docking station.

According to one aspect of the invention, a computer system includes a host processor, a first PCI bus, a second PCI bus and a PCI to-PCI bridge. The first PCI bus is coupled with the host processor. The PCI-to-PCI bridge interconnects the first and second PCI buses. The PCI-to-PCI bridge includes a first portion and a second portion. The first portion includes a first configuration register and the second portion includes a second configuration register.

According to another aspect of the invention, a bridge is provided that couples between a first bus and a second bus. The bridge includes a first bridge portion, a second bridge portion and a connector. The first bridge portion has a first configuration register, and the second bridge portion has a second configuration register. The connector removably couples together the first bridge portion and the second bridge portion.

According to even another aspect of the invention, a computer system includes a notebook computer, a docking station, and a bus bridge. The notebook computer has a first PCI bus, and the docking station has a second PCI bus. The bus bridge is coupled between the first PCI bus and the second PCI bus. The bus bridge includes a first configuration register, a second configuration register, and a connector provided between the first configuration register and the second configuration register. The connector is operative to removably mate/demate the first PCI bus and the second PCI bus when mating/demating the notebook computer and the docking station.

According to yet another aspect of the invention, a method is provided for mating a first PCI bus with a second PCI bus. The first PCI bus is provided by a first agent and the second PCI bus is provided by a second agent. The method includes the steps of: providing a bus bridge having a first portion, a second portion and a connector configured to removably mate together the first portion and the second portion; and removably mating together the first PCI bus and the second PCI bus by coupling together the first portion and the second portion with the connector.

One advantage is provided by the ability to physically separate a pair of PCI buses which facilitates implementation between two separate locations that are capable of being physically separated.

BRIEF DESCRIPTION OF THE DRAWINGS

Preferred embodiments of the invention are described below with reference to the following accompanying drawings.

FIG. 2 is a block diagram of a physically separable, two part PCI bus bridge according to one embodiment of the present invention.

FIGS. 3A–3D are block diagrams illustrating four distinct arrangements of configuration registers as arranged on primary and secondary sides of the physically separable, two part PCI bus bridge of FIG. 2.

FIG. 4 is a functional block diagram of the physically separable, two part PCI bus bridge of FIG. 2 illustrating one implementation suitable for coupling together a laptop computer and a docking station.

FIG. 5 is an assembly diagram illustrating the assembly of FIGS. 6A and 6B.

FIGS. 6A–6B provide a table illustrating the PCI bus bridge configuration space registers for the PCI bus bridge of FIGS. 2 and 4.

DETAILED DESCRIPTION OF THE PREFERRED EMBODIMENTS

Figure 1:
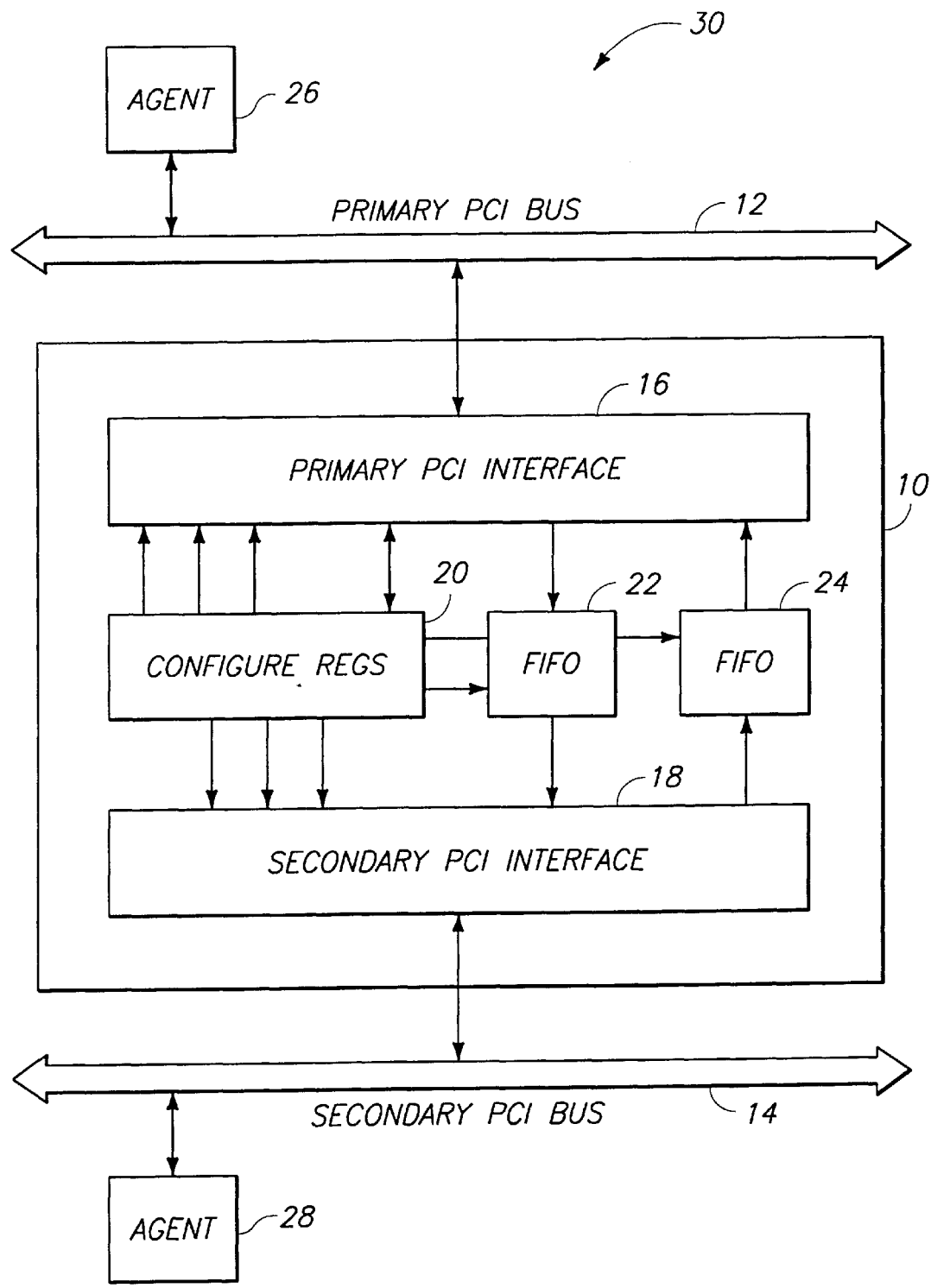
FIG. 1 is a block diagram of a prior art implementation of a conventional PCI bus bridge illustrated in use with a computer system.

This disclosure of the invention is submitted in furtherance of the constitutional purposes of the U.S. Patent Laws "to promote the progress of science and useful arts" (Article 1, Section 8).

A method and apparatus are provided for forming a PCI bus bridge connection with physically separable parts between separate PCI buses within a computer system. In this detailed description, one embodiment of a computer system which includes a primary PCI bus and a secondary PCI bus is described. The system also includes a primary PCI interface and a secondary PCI interface that are removably coupled together via a connector and cable. It should be understood that this system is for the purpose of illustration and is not provided as a limitation in that the present invention may be practiced on other computer systems where it is desirable to utilize a releasable connection bus bridge between a pair of buses.

A PCI bus bridge provides an interface between a primary PCI bus and a secondary PCI bus. Typically, a PCI bus bridge forms a connection between two subsystems, with PCI agents being connected to each PCI bus. Usually, the local bus coupled to the host CPU is referred to as a primary bus, and any bus coupled to PCI agents, units or other PCI bus bridges is referred to as a secondary bus.

For purposes of this disclosure, PCI refers to Peripheral Component Interconnect, a local bus standard initiated by Intel Corporation, and defined by the PCI Local Bus Specification, Revision 2.0 published by the PCI Special Interest Group. A bridge is used to decouple a processor and an expansion bus, and can have a bus width of 32 bits, or 64 bits. According to one implementation, the bridge is configured to have a 32-bit bus width.

Referring now to FIG. 1, a computer system having an architecture that incorporates features of Applicant's invention is identified by reference numeral 130. Computer system 130 includes a PCI bus bridge 110 having a separable serial interconnection, or connector 112 configured to removably couple together a primary PCI bus 12 with a secondary PCI bus 14. According to one construction, connector 112 comprises a pair of male and female serial gigabit ethernet interface, or gigabit link, connectors, such as a 20 pin serial male/female connector usable to include a 1 gigabit, 2 pair cable, as shown below in the embodiment depicted in FIG. 4. According to one application depicted in FIG. 4, PCI bus bridge 110 is used to removably connect a laptop computer with a docking station. However, it is understood that PCI bus bridge 110 can be used to removably connect together any of a number of buses that require the ability to separate the buses both electrically and physically.

As shown in FIG. 1, PCI bus bridge 110 includes primary configuration registers 120 and secondary configuration registers 121 that are provided on opposite sides of connector 112, in two distinct physical locations. Hence, primary configuration registers 120 are provided on a primary side, or portion, 126 of bridge 110 and secondary configuration registers 121 are provided on a secondary side, or portion, 127 of bridge 110. Connector 112 separates such primary and secondary sides 126, 127 of bridge 110. In contrast, prior art bus bridges typically use centrally located configuration registers that are shared by both sides of the bus bridge. Accordingly, PCI bus bridge is split into two parts or sides; namely, primary bridge portion 126 and secondary bridge portion 127, with connector 112 providing a signal interconnection having a limited number of wires.

Primary configuration registers 120 and secondary configuration registers 121 form redundant configuration registers that are separable via connector 112. Registers 120 are provided on primary bridge portion 126 of bridge 110 and registers 121 are provided on secondary bridge portion 127 of bridge 110. In operation, bridge 110 forms a latency inducing bus that connects together buses 12 and 14. As described below in greater detail with reference to FIGS. 3A–3D, registers 120 and 121 are provided in four different types. First, registers are provided that exist only in the primary side of the bridge. Secondly, registers are provided that exist only in the secondary side of the bridge. Thirdly, registers are provided that exist as read/write registers in the primary side of the bridge and write a shadow register in the secondary bridge. Finally, registers are provided that exist as read/write registers in the secondary side of the bridge and use a shadow register in the primary side of the bridge. As shown in FIG. 2, a pair of FIFO queues 122, 124 and 123, 125 are coupled with primary PCI interface 116 and secondary PCI interface 118, respectively. FIFO queue 122 is connected to FIFO queue 123 via the serial communication link provided by connector 112. More particularly, parallel-to-serial (P/S) interface circuitry 160 and serial-to-parallel (S/P) interface circuitry 161 are used to join FIFO queue 122 and FIFO queue 123. Similarly, FIFO queue 125 is connected with FIFO queue 124 via the serial communication link provided by connector 112. More particularly, parallel-to-serial (P/S) interface circuitry 163 and serial-to-parallel (S/P) interface circuitry 162 are used to join FIFO queues 125 and 124. Accordingly, FIFO queues are provided at each end of the serial communication link for transfers in each direction. Such configuration is required because a performance mismatch will be encountered between the PCI buses 12, 14 and other serial buses connected therewith.

P/S interface circuitry 160, 163 and S/P interface circuitry 161, 162 cooperate to form a serial communication bus within bus bridge 110. P/S interface circuitry 160 and 163 converts a parallel interface to a serial interface which is transmitted through bus bridge 110. Similarly, S/P interface circuitry 161, 162 is used to receive the serial interface signal and convert it back to a parallel interface configuration. It is understood that interface circuitry 160–163 also includes respective transmitting and receiving circuitry that is operative to deliver signals across connector 112 of bus bridge 110.

In operation, such construction is required since a serial bus will form a dedicated link and PCI buses 12 and 14 provided on opposite sides of bridge 110 may be shared by other devices, and may have access times that are very different from the respective dedicated serial buses 12 and 14. As shown in FIG. 2, FIFO queue 122 uses the serial communication link provided through connector 112, via interface circuitry 160–163, to continuously transmit required FIFO status bits from primary PCI interface 116 to secondary PCI interface 118. FIFO queue 123 receives the transmitted FIFO status bits at secondary PCI interface 118 from primary PCI interface 116. Similarly, FIFO queue 125 transmits FIFO status bits from secondary PCI interface 118 to primary PCI interface 116 and FIFO queue 124 receives the transmitted FIFO status bits from secondary PCI interface 118 to primary PCI interface 116.

In operation, the serial link provided by interface circuitry 160–163, through connector 112 of bridge 110, transmits two types of information packets; namely, idle and data packets. The idle packets contain a single byte of information. The data packets transmit 40 bits of information. The data packets contain either PCI data and byte enables, or PCI address and commands. The idle packet contains eight bits of status or control information. As a result of the special requirements for FIFO status latency, FIFO flags are transmitted in both the command and data packets. Accordingly, PCI bus bridge 110 is removably connected via connector 112 by use of FIFO queues 122–125, in combination with configuration registers 120 and 121 which are removably separable via connector 112.

Further details of the construction and operation of FIFO queues 122–125 are described in greater detail in Applicant's co-pending patent application, "PCI Bridge Having Latency Inducing Serial Bus", U.S. patent application Ser. No. 09/312,206, naming inventors Ronald E. Lange and David Ross Evoy, having attorney docket No. VL5-053, and filed concurrently herewith. Which is herein incorporated by reference.

In operation, FIFO queues 122–125 are configure to prevent a FIFO overrun when the primary part, or side, 126 and secondary part, or side, 127 of bridge 110 are configured in physically separate locations. Pursuant to such implementation, the two parts 126 and 127 of PCI bridge 110 are connected together by a latency inducing serial connection, or bus. Such technique relies upon a single bit of information being provided via a serial bus by way of connector 112 which provides a threshold level to control serial transmission between primary part 126 and secondary part 127.

FIGS. 3A–3D illustrate four different types of individual registers provided by primary configuration registers 120 and secondary configuration registers 121 provided on primary part 126 and secondary part 127, respectively, of PCI bus bridge 110 (of FIG. 2). More particularly, FIG. 3A depicts "Type 1" configuration registers that only exist in the primary part 126 of bridge 110. Such "Type 1" configuration registers are read/write registers that only exist in primary part 126 of bridge 110. For example, one instance of "Type 1" configuration registers includes Vendor ID and Device ID registers. In operation, the secondary part 127 of bridge 110 is not dependent upon these "Type 1" registers.

FIG. 3B depicts "Type 2" configuration registers that only exist in the secondary part 127 of bridge 110. Such "Type 2" configuration registers are read/write registers that only exist in the secondary part 127 of bridge 110. In operation, the "Type 2" configuration registers include a secondary bridge control register that contains status from the secondary part 127 of bridge 110, namely from bus 14, and controls the operation of the secondary part 127 of bridge 110.

Additionally, FIG. 3C depicts "Type 3" configuration registers that exist as read/write registers in the primary part 126 of bridge 110, and operate to write a shadow register in the "Type 3" registers on the secondary part 127 of bridge 110. "Type 3" configuration registers include address registers like I/O Base 2 address registers. Such I/O Base 2 address registers are configured to set the address range for primary part 126, and the secondary part 127 uses the complement to select a target I/O address range. Such I/O Base 2 registers can be made available before a serial link; i.e., connector 112 of FIG. 2, is enabled between primary bus 12 and secondary bus 14.

Finally, FIG. 3D depicts "Type 4" configuration registers that exist as read/write registers in the secondary part, or side, 127 of bridge 110. "Type 4" configuration registers use a shadow register located in the primary part, or side, 126 of bridge 110. For cases where registers need to be visible on both sides of bridge 110, the "Type 4" configuration registers are preferred. Such construction is preferred because verification that the serial link of bridge 110 is operational can be implemented via a software algorithm. One algorithm implementation comprises comparing the read and write operations performed to these registers. A secondary status register is provided in the "Type 4" configuration registers which is read from the secondary part 127 of bridge 110. According to one construction, the secondary status register is located in a 32 bit range with the I/O Limit 1 Address registers. Such secondary status register is made available in both the primary part 126 and secondary part 127 of bridge 110. The secondary status, I/O Limit 1 Address and I/O Base I Address, comprising 4 bytes, are all made "Type 4" which: provides the Address information to the primary part 126 and secondary part 127 of bridge 110; allows the secondary part 127 of bridge 110 to supply the read bits for the Secondary Status registers; and provides a consistent method for accessing all of the bits within a resulting 32 bit word.

One exemplary PCI bus configuration and implementation for bridge 110 (of FIGS. 2–3) is illustrated below with reference to FIG. 4 depicting PCI bus bridge 110 used to removably couple together a notebook computer and a docking station. FIG. 5 illustrates a PCI configuration Space 0 Register Map for the PCI bus bridge 110 implementation depicted in FIG. 4.

As shown in FIG. 4, a notebook computer 154 includes a primary PCI bus 12 and bus interface circuitry 157. Bus interface circuitry 157 includes primary side 126 of bus bridge 110, such as primary PCI interface 116, configuration registers 120, and serial interconnection bus circuitry 130. Bus interface circuitry 157 also includes a local VP bus 142 coupled with a plurality of interface ports 134, 136, 138 and 140.

Workstation 156 includes secondary PCI bus 14 and bus interface circuitry 159. Bus interface circuitry 159 includes secondary portion of bus bridge 110; namely, secondary PCI interface 118, configuration registers 121, and serial interconnection bus circuitry 132. Bus interface circuitry 159 also includes a VP local bus 152 coupled with a plurality of communication ports 144, 146, 148 and 150.

Serial interconnection bus circuitry 130 and 132 each comprise FIFO queues 122, 124 and 123, 125, respectively, and interface circuitry 160, 162 and 161, 163, respectively (as shown in FIG. 2). It is understood that serial interconnection bus circuitry 130 and 132 also each comprise transmitting and receiving circuitry included with interface circuitry 160–163 (of FIG. 2) and operative to transmit and receive between primary portion 126 and secondary portion 127 of bus bridge 110. It is also understood that serial interconnection bus circuitry 130 and 132 are signal coupled together via a serial communication link 131, including connector 112. Serial communication link 131 is removably connected via connector 112, between bus circuitry 130 and 132. In one form, serial communication link 131 forms a part of a serial bus, defined by bus circuitry 130, 132 and communication link 131.

Also shown in FIG. 4 are Universal Asynchronous Receiver Transmitter (UART) ports 134 and 144; namely, an electronic circuit that is operative to transmit and receive data via a serial bus. Ports 136 and 146 each comprise an Enhanced Capabilities Port (ECP), an IEEE1284 enhanced parallel port having a relatively high-speed transfer rate. Furthermore, ports 138, 140 and 148, 150 each comprise a PS2, a 6-pin mini DIN plug and socket port usable to connect input devices such as a keyboard and a mouse to an IBM PS/2 computer system. However, it is understood that any of a number of other types of ports could be coupled via local buses 142 and 152 with interfaces 116 and 118, respectively.

FIGS. 6A and 6B cooperate to illustrate one exemplary PCI bridge configuration register map suitable for use with the bridge 110 of FIG. 4. Such table summarizes all of the PCI bridge configuration space registers of such PCI bus bridge, many of which are defined by PCI specifications set by the PCI Special Interest Group (SIG).

In compliance with the statute, the invention has been described in language more or less specific as to structural and methodical features. It is to be understood, however, that the invention is not limited to the specific features shown and described, since the means herein disclosed comprise preferred forms of putting the invention. into effect. The invention is, therefore, claimed in any of its forms or modifications within the proper scope of the appended claims appropriately interpreted in accordance with the doctrine of equivalents.

What is claimed is:

1. A computer system comprising:
a host processor;
a first PCI bus coupled with the host processor;
a second PCI bus;
a PCI-to-PCI bridge interconnecting the first and second PCX buses, the PCI-to-PCI bridge including a first portion and a second portion,
the first portion comprises
a first configuration register; and
a primary side of the bridge,
the second portion comprises
a second configuration register; and
a secondary side of the bridge,
the first and second configuration registers providing configuration registers that are redundant to one another, and
the first configuration register comprises
read/write registers operative to write a shadow register in the second configuration register.

2. A computer system comprising:
a host processor;
a first PCI bus coupled with the host processor;
a second PCI bus;
a PCI-to-PCI bridge interconnecting the first and second PCI buses, the PCI-to-PCI bridge including a first portion and a second portion,
the first portion comprises
a first configuration register; and
a primary side of the bridge,
the second portion comprises
a second configuration register; and
a secondary side of the bridge,
the first and second configuration registers providing configuration registers that are redundant to one another, and
the second configuration register comprises
read/write registers operative to write a shadow register in the primary configuration register.

3. A bridge coupled between a first bus and a second bus, comprising:
a first bridge portion having a first configuration register;
a second bridge portion having a second configuration register, the first and second configuration registers providing configuration registers that are redundant to one another;
a connector removably coupling together the first bridge portion and the second bridge portion;
a first agent coupled to the first bus, comprises a notebook computer; and
a second agent coupled to the second bus, comprises a docking station.

4. A bridge coupled between a first bus and a second bus, comprising:
first bridge portion having a first configuration register;
a second bridge portion having a second configuration register, the first and second configuration registers providing configuration registers that are redundant to one another; and
a connector removably coupling together the first bridge portion and the second bridge portion, wherein the first configuration register comprises read/write registers operative to write a shadow register in the second configuration register.

5. A bridge coupled between a first bus and a second bus, comprising:
a first bridge portion having a first configuration register;
a second bridge portion having a second configuration register, the first and second configuration registers providing configuration registers that are redundant to one another; and
a connector removably coupling together the first bridge portion and the second bridge portion, wherein the second configuration register comprises read/write registers operative to write a shadow register in the first configuration register.

6. A computer system, comprising:
a notebook computer having a first PCI bus;
a docking station having a second PCI bus; and
a bus bridge coupled between the first PCI bus and the second PCI bus, the bus bridge including a first configuration register, a second configuration register, and a connector provided between the first configuration register and the second configuration register, the first and second configuration registers providing configuration registers that are redundant to one another;

wherein the connector is operative to removably mate/demate the first PCI bus and the second PCI bus when mating/demating the notebook computer and the docking station.

7. The computer system of claim 6 wherein the bus bridge comprises a first FIFO queue communicating with the first configuration register and a second FIFO queue communicating with the second configuration register.

8. The computer system of claim 6 wherein the bus bridge comprises a latency inducing bus.

9. The computer system of claim 6 wherein the bus bridge comprises a first portion and a second portion, wherein the first configuration register is provided in the first portion and the second configuration register is provided in the second portion.

10. The computer system of claim 9 wherein the connector removably couples together the first portionend the second portion.

11. The computer system of claim 9 wherein the first portion includes a primary PCI interface and the second portion includes a secondary PCI interface.

12. A method of mating a first PCI bus with a second PCI bus, the first PCI bus provided by a first agent and the second PCI bus provided by a second agent, the method comprising the steps of:

providing a bus bridge having a first portion, a second portion and a connector configured to removably mate together the first portion and the second portion; and removably mating together the first PCI bus and the second PCI bus by coupling together the first portion and the second portion with the connector, wherein the step of removably mating together comprises connecting together a plug and socket connector.

13. A method of mating a first PCI bus with a second PCI bus, the first PCI bus provided by a first agent and the second PCI bus provided by a second agent, the method comprising the steps of:

providing a bus bridge having a first portion, a second portion and a connector configured to removably mate together the first portion and the second portion, wherein the bus bridge includes a first configuration register provided in the first portion and a second configuration register provided in the second portion, the first and second configuration registers providing configuration registers that are redundant to one another;

removably mating together the first PCI bus and the second PCI bus by coupling together the first portion and the second portion with the connector; and comparing read operations and write operations performed to the first configuration register and the second configuration register.

* * * * *